(12) United States Patent
Radburn (10) Patent No.: US 10,563,991 B2
(45) Date of Patent: Feb. 18, 2020

(54) CIRCULAR ROUTING

(71) Applicant: Ordnance Survey Limited, Southampton, Hampshire (GB)

(72) Inventor: Andrew Radburn, Southampton (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 185 days.

(21) Appl. No.: 15/800,542

(22) Filed: Nov. 1, 2017

(65) Prior Publication Data

US 2018/0128627 A1 May 10, 2018

(30) Foreign Application Priority Data

Nov. 4, 2016 (EP) .................................... 16197437

(51) Int. Cl.
*G01C 21/34* (2006.01)
*G06F 16/29* (2019.01)
*G01C 21/36* (2006.01)
*G06Q 10/04* (2012.01)

(52) U.S. Cl.
CPC ....... *G01C 21/343* (2013.01); *G01C 21/3476* (2013.01); *G01C 21/3484* (2013.01); *G01C 21/3614* (2013.01); *G01C 21/3667* (2013.01); *G06F 16/29* (2019.01); *G06Q 10/047* (2013.01)

(58) Field of Classification Search
CPC .............. G01C 21/343; G01C 21/3476; G01C 21/3484; G01C 21/3614; G01C 21/3667; G06F 16/29; G06Q 10/047
USPC ........................................................ 701/426
See application file for complete search history.

(56) References Cited

U.S. PATENT DOCUMENTS

| 7,162,363 | B2 * | 1/2007 | Chinitz ................ | G01C 21/343 340/995.19 |
| 8,095,303 | B1 | 1/2012 | Nesbitt et al. | |
| 8,612,142 | B2 * | 12/2013 | Zhang .................... | G01C 21/20 701/425 |
| 2007/0156335 | A1 * | 7/2007 | McBride ................ | G01C 21/20 701/533 |
| 2009/0248295 | A1 * | 10/2009 | Grewe ............... | G01C 21/3461 701/533 |

(Continued)

FOREIGN PATENT DOCUMENTS

| EP | 2657865 A1 | 10/2013 |
| JP | 2015175656 A | 10/2015 |

OTHER PUBLICATIONS

Jun. 9, 2017—(EP) Extended Search Report—App 16197437.3.

*Primary Examiner* — Thomas G Black
*Assistant Examiner* — Luat T Huynh
(74) *Attorney, Agent, or Firm* — Banner & Witcoff, Ltd.

(57) ABSTRACT

Aspects described herein provide a computer-implemented method and system of generating circular routes that start and end at the same geographical position, the route passing through a number of intermediate points along the way. The circular routes are generated in dependence on one or more route criterion, which may be pre-defined or input by the user. The route criterion may relate to a number of different route properties, for example, the length of time it takes to complete the route, the distance or area covered by the route, the direction the route takes, the type of terrain experienced during the route, whether the route passes through certain points more than once and/or whether the route passes any points of interest.

20 Claims, 6 Drawing Sheets

(56) References Cited

U.S. PATENT DOCUMENTS

| | | | |
|---|---|---|---|
| 2010/0305852 A1* | 12/2010 | Eger | G01C 21/20 |
| | | | 701/533 |
| 2012/0143497 A1* | 6/2012 | Van Hende | G01C 21/343 |
| | | | 701/432 |
| 2013/0006521 A1 | 1/2013 | Needham et al. | |
| 2013/0238240 A1 | 9/2013 | Tamai et al. | |
| 2013/0304377 A1* | 11/2013 | Van Hende | G01C 21/20 |
| | | | 701/533 |

* cited by examiner

Prior Art

Figure 1

Prior Art

CIRCULAR ROUTING

FIELD

Aspects described herein relate to a computer implemented method and system for generating a circular route on a digital map that starts and ends at the same geographical position. In particular, aspects relate to a computer implemented method and system for generating a circular route on a digital map according to one or more route criteria.

BACKGROUND

Figure 1:
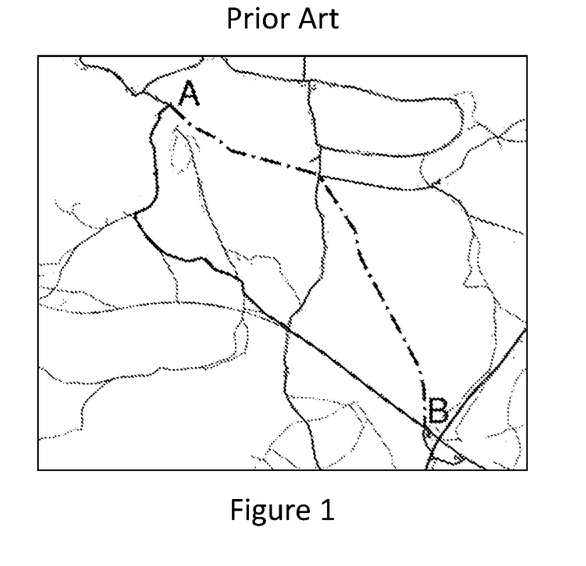
FIG. 1 illustrates a first prior art route from point A to point B.
Figure 2:
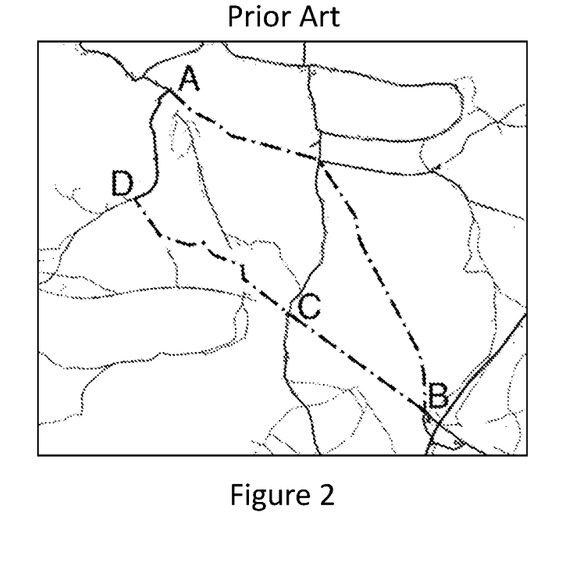
FIG. 2 illustrates a second prior art route from point A to point D, passing by points B and C.

The generation of routes on a digital map between known points A and B as illustrated by FIG. 1 is well known. These known methods take into account various geographical data to calculate the best route that passes between these points, taking into consideration criteria such as minimising the distance travelled or the time taken to complete the route, or minimising the environmental footprint of the vehicle used for the journey. In such systems, the route may be required to pass through a number of predetermined geographical points. For example, in FIG. 2, a route is generated between two points A and D, passing through points B and C along the way.

Figure 3:
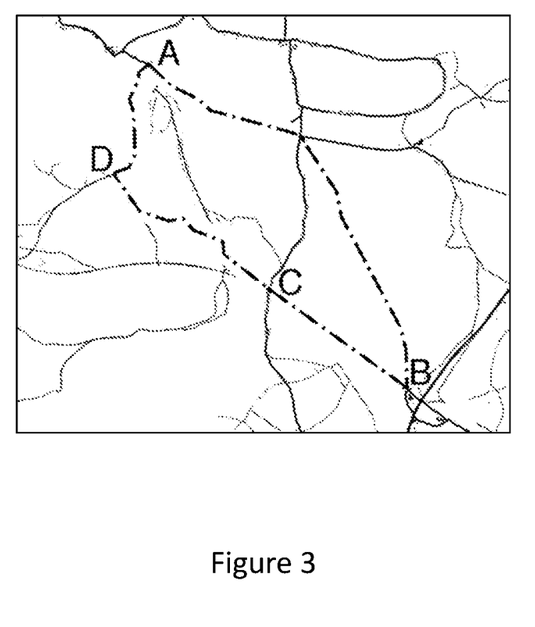
FIG. 3 illustrates a circular route starting and ending at point A, and passing by points B, C and D.

However, in many situations, a user may wish to start and end at the same point, for example, in leisure activities such as walking, horse riding, running or cycling. An example of a circular route starting and ending at the same position is shown in FIG. 3. In these situations, the user may wish the route to take a certain amount of time to travel, cover a certain distance and/or pass through one or more points of interest. In route generation systems known in the art, if a user inputs the start and end point as the same geographical location, no route will be generated. At most, the user will be provided with some indication that they are at their desired destination.

Therefore, a method of circular route generation is required to provide users with a route that starts and ends at the same geographical location.

SUMMARY

Aspects described herein address the above noted problems by providing a computer-implemented system and method of generating circular routes that start and end at the same geographical position, the route passing through a number of intermediate points along the way. The circular routes are generated in dependence on one or more route criterion, which may be pre-defined or input by the user. The route criterion may relate to a number of different route properties, for example, the length of time it takes to complete the route, the distance or area covered by the route, the direction the route takes, the type of terrain experienced during the route, whether the route passes through certain points more than once and/or whether the route passes any points of interest.

In a first aspect, a computer implemented method of generating one or more geographic routes across a geographic area that start and end at the same geographical position A is provided. The method comprises the steps of obtaining route calculation metadata relating to desired parameters of the geographic route to be generated, the metadata including the position A, and one or more criteria from a group at least comprising: a route time criterion and/or a route distance criterion, calculating, using geographical data representing the geographic area, one or more geographic routes across the geographic area that start and end at the position A and which at least partially meet one or more of the criteria included in the route calculation metadata, and providing the calculated routes for output.

In doing this, a user is able to request a route that starts and ends at the same geographical location, and which takes a certain amount of time to complete and/or covers a certain amount of distance. This criteria is then used to calculate circular routes that start and end at the same point, and which pass through several different intermediate points along the way. Consequently, when a user requests a route that starts and ends at the same place, the user is not presented with a null response on the grounds that they are already at their desired destination.

The step of calculating may comprise ranking the one or more geographic routes based on the extent to which the one or more geographic routes meet the one or more criteria. That is to say, the routes are ranked according to how well they meet the one or more criteria. This allows routes that best meet the criteria to be preferentially offered to a user as options.

For example, where the criteria comprises a route time criterion indicating a preferred travel time, the one or more geographic routes may be ranked based on the similarity of the preferred travel time to an estimated travel time of the one or more geographic routes. That is, routes that are expected to take a similar length of time to complete as the time indicated in the criteria are ranked higher than those which are significantly shorter or longer.

Similarly, where the criteria comprises a route distance criterion indicating a preferred distance, the one or more geographic routes may be ranked based on the similarity of the preferred distance to an actual distance of the one or more geographic routes. That is, routes that are of a similar distance to the distance indicated in the criteria are ranked higher than those which are significantly shorter or longer.

The one or more criteria may further comprise a route area criterion, wherein route area criterion may be obtained by calculating the size of the geographical area covered by the one or more geographic routes. For example, the geographical area covered by a geographic routes may be calculated from the area enclosed within the route. The method one or more geographic routes may then be ranked based on the size of the geographical area covered. In this respect, routes that cover a larger geographical area will be ranked higher than routes covering a smaller geographical area.

Including an area criterion ensures that the method does not simply calculate routes consisting of a straight line, for example, from position A to position B and back. Such a route is particularly undesirable in leisure activities such as walking, running, cycling, horse riding and the like, where variable terrain and landscape make the activity a lot more interesting and enjoyable. Therefore, it may be desirable that a route covers as large a geographical area as possible within the limits of the time and/or distance criteria.

The one or more criteria may further comprise a route direction criterion indicating a preferred direction of travel. For example, the user may wish to head in a overall south-west direction.

The one or more criteria may further comprise a route interest criterion indicating one or more points of interest to be included in the one or more geographic routes. For example, the user may wish to pass a river, lake, pub, historical landmark or any other points of interest along the route.

The one or more criteria may further comprise a route difficulty criterion indicating a level of difficulty and/or an accessibility requirement of the one or more geographic routes. For example, the user may wish the route to be hilly or have wheelchair access.

The one or more criteria may further comprise a route surface criterion indicating at least one type of terrain to be included in the one or more geographic routes. For example, the user may indicate that the route should be along a tarmac road or a woodland path.

The one or more criteria may further comprise a route similarity criterion, wherein the route similarity criterion is obtained by evaluating the number of repeated geographical positions included in the one or more geographic routes. Preferably, routes having a small number of repeated geographical positions are ranked higher than those with a lot of repetition. This helps to ensure that the route does not go through the same geographical location several times, for example, as a straight lined route (i.e. from A to B to A) would.

The step of ranking may comprise calculating a score corresponding to at least one of the one or more criteria included in the route calculation metadata. For example, the routes may be scored from 0 to 1 for each of the criteria that has been set. These scores can then be added, with the highest scoring route being the one that best matches the criteria.

This score may be weighted in dependence on the criteria to which it corresponds. For example, the route time criterion, route distance criterion and route area criterion may be considered more important than the other criteria, and therefore be weighted so that they have a larger impact on the overall score.

The step of calculating the one or more geographic routes may comprise generating a first set of geographic routes, ranking the first set of geographic routes based on the extent to which the first set of geographic routes meet the one or more criteria, and selecting a plurality of best fit geographic routes from said ranking.

The plurality of best fit geographic routes may then be used to generate a second set of geographic routes. This helps to eliminate a number of the calculated routes from consideration, particularly those that do not meet the criteria to an acceptable level.

Generating the second set of geographic routes may comprise one or more of combining all of the plurality of best fit geographic routes in one or more different ways, combining one or more subsets of the plurality of best fit geographic routes, modifying the plurality of best fit geographic routes by removing at least one geographical position therefrom, and generating one or more of the second set of geographic routes using the method described above.

The step of calculating the one or more geographic routes may be paused or stopped when one or more of the following thresholds is reached: a time threshold indicating a time limit for calculating the one or more geographic routes, a criteria threshold indicating the maximum number of routes that at least partially meet the one or more criteria, and a number threshold indicating the maximum number of routes to be calculated.

The step of providing the calculated routes for output may comprise generating a visual representation of the one or more geographical routes for output to a visual display. The visual representation comprises a map image of the geographic area. The route may then be shown on the map image in any suitable way, for example, as a coloured line.

The step of providing the calculated routes for output may also comprise providing criteria information regarding the extent to which the one or more geographic routes meet the one or more criteria. For example, the score of each route (overall and/or for each criteria) may be output to the user so they can see how well each route matched their criteria.

Another aspect provides a system comprising a processor, and a computer readable medium storing one or more instruction(s) arranged such that when executed the processor is caused to perform a method of generating one or more geographic routes across a geographic area that start and end at the same geographical position A is provided, the method comprising the steps of obtaining route calculation metadata relating to desired parameters of the geographic route to be generated, the metadata including the position A, and one or more criteria from a group at least comprising: a route time criterion and/or a route distance criterion, calculating, using geographical data representing the geographic area, one or more geographic routes across the geographic area that start and end at the position A and which at least partially meet one or more of the criteria included in the route calculation metadata, and providing the calculated routes for output.

BRIEF DESCRIPTION OF THE DRAWINGS

Further features and advantages described herein will become apparent from the following description of aspects and embodiments thereof, presented by way of example only, and by reference to the drawings, wherein.

DETAILED DESCRIPTION OF DRAWINGS

Figure 4:
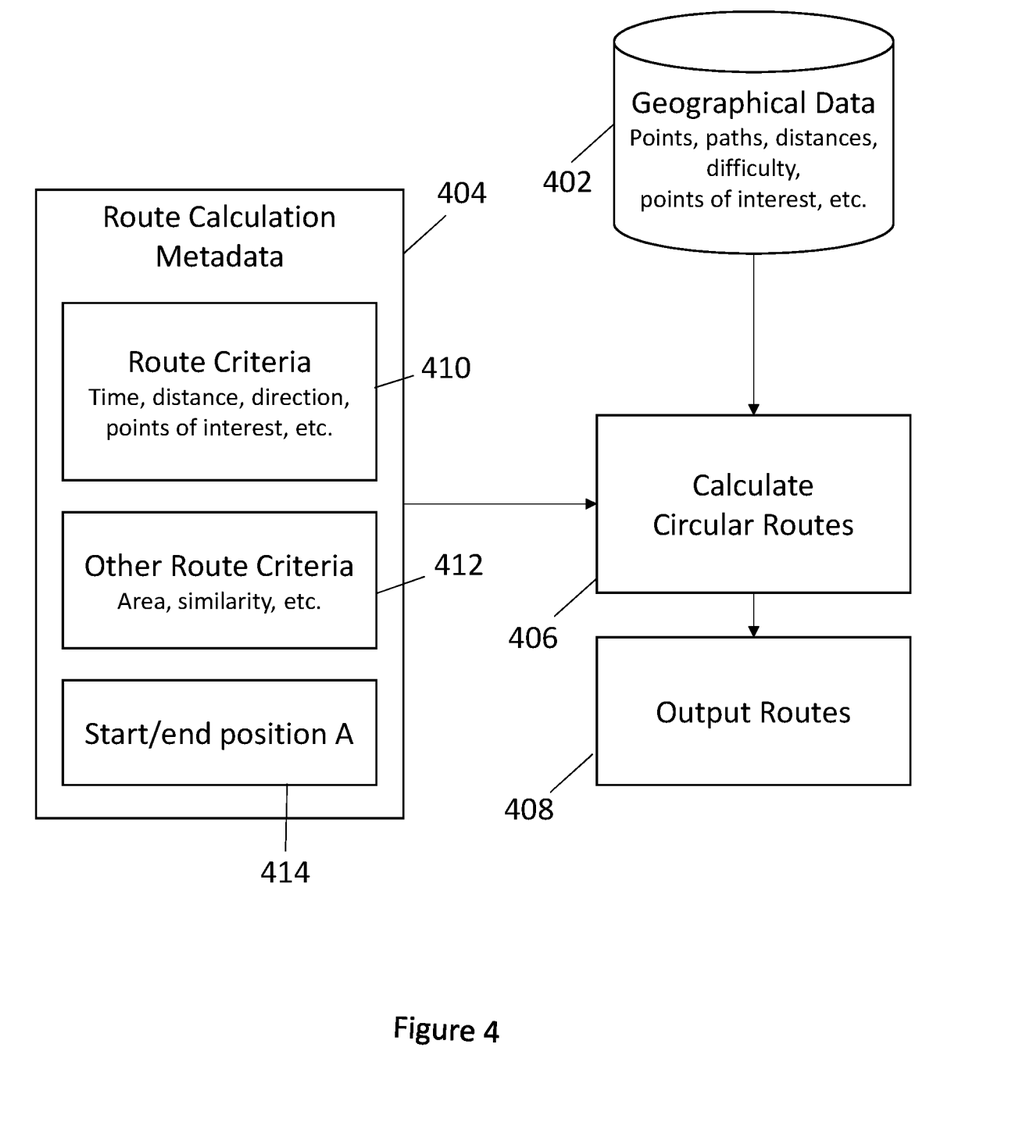
FIG. 4 illustrates a method of circular route generation according to one or more illustrative aspects described herein.

FIG. 4 illustrates a method for calculating and generating circular routes, starting and ending at the same position A, such as the circular route shown in FIG. 3.

The method uses known geographical data 402 and route calculation metadata 404 received from a user to calculate one or more circular routes 406 that start and end at the same geographical location. A visual representation of the circular routes can then be generated and output 408 to the user by way of some visual display suitable for displaying digital map data.

The geographical data 402 used to calculate the circular route(s) includes any data representative of the geographic landscape. For example, the geographical data 402 may include information relating to a number of specific geographical points and the distance therebetween, existing paths between said points, the difficulty of those paths in either direction, the type of path surface (for example, tarmac, gravel), the type of terrain (for example, hilly, flat), points of interest located on the paths or within the vicinity of the paths (for example, visible or reachable from the paths) and their classification (for example, interesting rock formation, religious shrine, pub, restaurant), as well as any other geographical data of interest.

As discussed above, route calculation metadata 404 is also received from the user. This metadata 404 relates to desired parameters of the route to be calculated. The metadata 404 may include the position A 414 as well as one more route criteria 410, 412. A first group of route criteria 410 may include route time, route distance, route direction, route interest, route surface and route difficulty. Other route related criteria not described here may be also taken into consideration.

In most cases, at least a route time criterion and/or a route distance criterion is received from the user. For example, the user may require the route to take approximately 2 hours and/or cover a distance of 8 kilometres. When setting the time and/or distance criteria, the user may also be required to indicate how they wish to travel the route, for example, walking, running, cycling, horse riding or driving, for the simple reason that the time it takes to cover a distance will depend on how that distance is being covered.

The first group of route criteria 410 may also include route direction criteria, for example, a route direction criterion may be received indicating that the user would like the route to initially head in a south-west direction from the starting point A.

The first group of route criteria 410 may include route interest criteria. In this respect, a route interest criterion indicating points of interest may define general points of interest (for example, points of architectural interest, religious shrine, natural rock formations, etc.) that the user may like to see along the route. Other interest points indicated as a route interest criterion may define mandatory points of interest (for example, a particular pub, restaurant, etc.) that the route must pass through.

The first group of route criteria 410 may also include route surface criteria, for example, a route that follows a tarmac road or a dust path, or a route difficulty criteria, for example, a route that avoids steep hills or is accessible for a wheelchair.

The route calculation metadata 404 may comprise a second group of route criteria 412 including data such as route similarity or route area. Other criteria may also be taken into consideration. The first group of route criteria 410 may be criteria that is set by the user, whereas the second group of route criteria 412 may be route criteria relating to a pre-defined set of rules (i.e. not set by the user). In some cases, the criteria in the second group 412 may be considered less important than that in the first group of route criteria 410, and therefore be superseded by the criteria obtained from the first group 412, or vice versa.

The second group of route criteria 412 may include route similarity criteria, which evaluates how often the route passes by a certain geographical location (except for the start/end point A) more than once. Optionally, the user themselves may be given the opportunity to input a route similarity criterion indicating whether they wish to pass a certain geographical location more than once.

The second group of route criteria 412 may also include route area criteria, which evaluates the area covered by a route, for example, by calculating the area enclosed within the route. The route area criteria can be particularly important since it helps to ensure that the resulting route is not simply a straight line. For example, a route that starts at point A, defines a straight path to a point of interest 3 kilometres away and returns the same way to point A is not necessarily a very interesting route for the user, particularly in situations where the method described herein is being used to calculate routes for leisure activities. There may be situations where a straight line is the only possible route, but in situations where there are other routes possible, it is likely to be the least interesting option. As with route similarity, the user may also have the option of providing a route area criterion indicating the geographical area they wish to cover.

Figure 5:
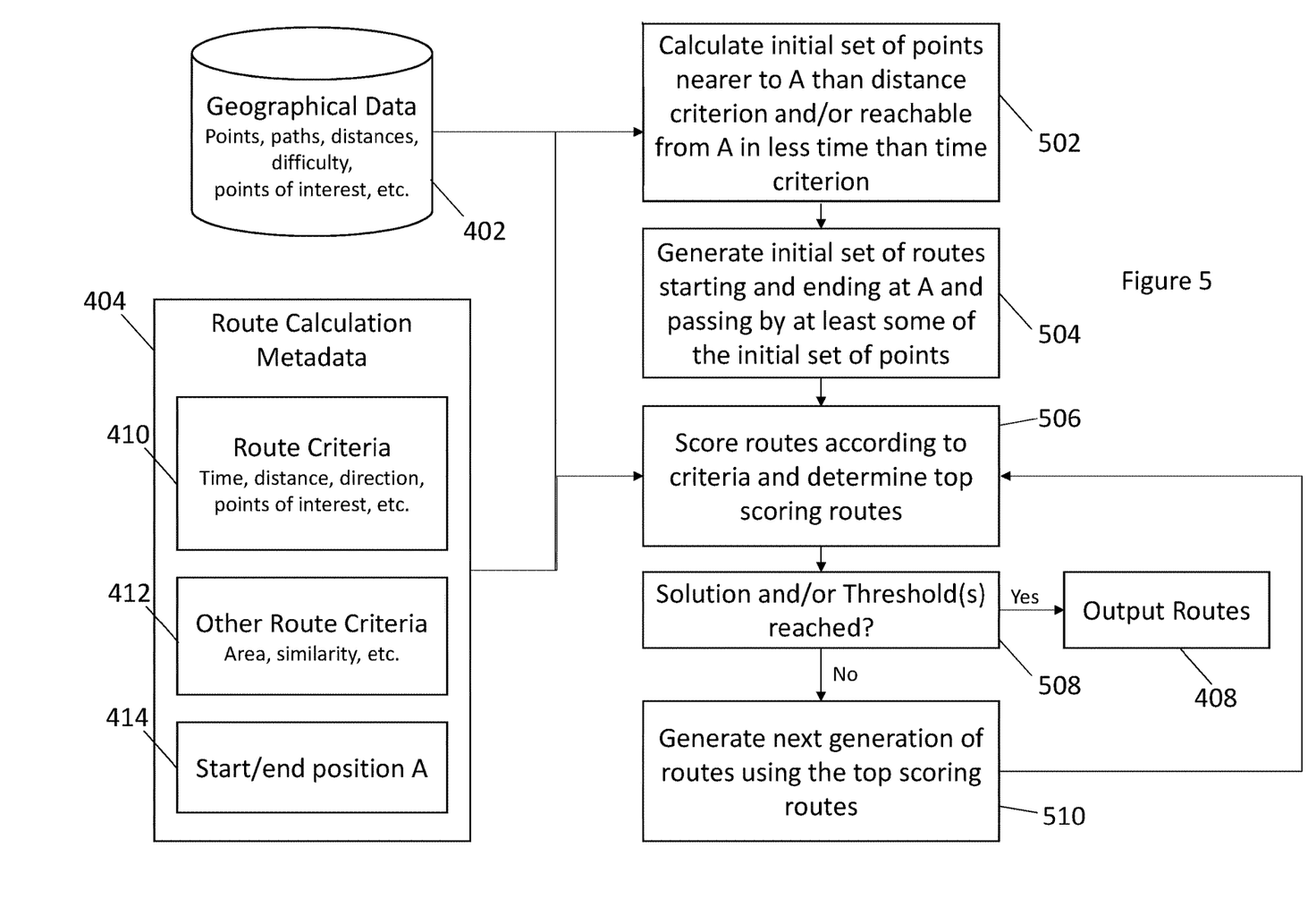
FIG. 5 illustrates the algorithm used to calculate one or more circular routes according to one or more illustrative aspects described herein.

The method used to calculate the circular routes using the geographical data 402 and the route calculation metadata 404 will now be described with reference to FIG. 5.

A set of routes starting and ending at a position A, passing by a number of points and according to said criteria may be calculated using a genetic algorithm. FIG. 5 shows a method of calculating a set of circular routes using a genetic algorithm based on the geographical information 402 and route calculation metadata 404.

Using the geographical data 402, an initial number of points or nodes are identified that agree with at least a route time and/or a route distance criterion received from the first group of route criteria 410 (step 502). Taking the route distance criterion into consideration, the initial set of points may be located at a distance from point A which is smaller than the distance indicated by the route distance criterion. Preferably, the initial set of points are located at distance from point A which is not more than half of the distance indicated by route distance criterion. Taking the route time criterion into consideration, the travel time between point A and the initial set of points may be less than the time indicated by the route distance criterion. Preferably, the travel time between point A and the initial set of points is not more than half of the time indicated by the route time criterion.

Using the initial set of points, an initial set of routes is generated (step 504), wherein the initial set of routes start and end at point A and pass by at least some of those initial set of points. In most cases, the initial set of routes may be generated at random, however, the skilled person will appreciate that the routes may be generated according to a set of pre-defined rules.

These initial set of routes are then scored on how well they match one or more of the route criteria (step 506). Determining how well the route matches a certain criteria may be done a number of different ways, for example, a route may score highly in the route distance criteria if the total distance covered by the route is approximate to the distance indicated by the route distance criterion. As another example, a route may score highly in the route area criteria if the area covered by the route is larger than the area covered by other routes. Weightings may be given to some of the criteria, for example, according to their importance. A final score per route may then be calculated based on the individual scorings for each route criteria and their respective weightings, for example, by adding up all of the individual scores. For consistency, the individual scores may also be normalised between 0.0 and 1.0 before multiplying by any weightings and/or they are combined.

When scoring a route according to route time criteria, routes having an estimated travel time approximate to the time indicated by the route time criterion will score higher than routes having a travel time that is longer or shorter than the time indicated by the route time criterion. That is, the bigger the difference between the estimated travel time of a route and the preferred travel time indicated by the time criterion, the lower the score. When scoring a route according to route distance criteria, routes covering a total distance approximate to the distance indicated by the route distance criterion will score higher than routes covering a total distance that is larger or smaller than the distance indicated by the route distance criterion. That is, the bigger the difference between the total distance of a route and the preferred distance indicated by the distance criterion, the lower the score.

When scoring either the route time or the route distance, one way of scoring may be to take the maximum possible length of the route (time or distance) and subtract the absolute difference between the length indicated by the time or distance criterion and the average length of the route. Routes that have a maximum possible length over a pre-defined value may automatically be scored zero to eliminate them for consideration altogether.

When scoring a route according to route direction criteria, routes in an overall direction matching that indicated by the route direction criterion will score higher than routes that head in a different direction to that indicated by the route direction criterion. As such, the scoring will scale according to how closely the route matches the direction indicated by the route direction criterion. The overall direction of a route may be determined by calculating the geometric centre of the route and then obtaining the direction from the start/end position A to the geometric centre. This calculated direction to the geometric centre may then be compared to the direction indicated by the route direction criterion.

When scoring a route according to route interest criteria, routes passing by or along those points of interest indicated by the route interest criterion will score higher than routes that do not pass by or along those points of interest. Similarly, routes passing by or along points of interest that are of the same type as those indicated by the route interest criterion will score higher than routes not passing by or along such points.

When scoring a route according to route surface criteria, routes with surfaces the same or similar to the surface indicated by the route surface criterion will score higher than routes with surfaces that are different to that indicated by the route direction criterion.

When scoring a route according to route difficulty criteria, routes that match the difficulty indicated by the route difficulty criterion will score higher than routes that do not meet difficulty criteria set by the user. For certain types of difficulty such as hilliness, the similarity of the route difficulty to that indicated in the route difficulty criterion can be considered (for example, by considering the level of gradient). However, it will be appreciated that for some route difficulty criterion, it will only be a question of whether the route difficulty criterion was met or not, for example, whether or not the route is wheelchair accessible. In such cases, the score will be either 0 or 1.

When scoring a route according to route similarity criteria, routes with duplicate points, that is, routes which pass by the same point more than once, may score lower than routes without duplicate points. Alternatively, the user may set a route similarity criterion that requires the route to pass through a particular point more than once, in which case routes passing through that point more than once will score higher than those which do not.

When scoring a route according to route area criteria, the routes will be ranked according to the area covered. Routes covering a larger area will be ranked higher than routes covering a smaller area. In this respect, the area covered by a route may be measured by calculating the area enclosed by the route. Routes that cover a larger area (i.e. the area enclosed by the route is larger) will be ranked higher and therefore receive a higher score.

Scoring the area covered by the route in this way means that the routes are optimised to give maximum coverage of the extent of the route (circularity), as well as being optimised in terms of time, distance and the other user criteria. As noted above, this prevents the routes from being a simple straight line from position A to a position B and back again.

Routes that score highly according to any of the route criteria will be considered as promising routes. Different route criteria may be considered more important than other route criteria when considering which routes are the most promising. For example, route time criteria, route distance criteria and/or route area criteria may have more importance than other criteria when considering which routes are the most promising. As such, the scores for these criteria may be weighted so that these individual scores have more bearing on the overall scoring.

Once these initial routes have been calculated and scored, if a solution has not been obtained (for example, a single route matching the route criteria has not been found) and/or the threshold for pausing the calculation has not been reached (as will be described in more detail below), the top scoring routes (i.e. the routes that best fit the route criteria) are carried forward to the next generation (step 510). In this respect, the top scoring routes may be those that have scored above a pre-determined acceptance value. For example, if the routes are being scored on a scale of 0 to 1, routes with a score of 0.7 or above may be considered to be best fit routes. Alternatively, a pre-defined number of routes, for example, the top 5 or 10 routes.

The next generation of routes may be generated in a number of ways. For example, the next generation of routes may be created by randomly combining all of the best fit routes in one or more different ways, by combining random combinations of the best fit routes, randomly removing one or more individual points from the best fit routes, moving one of the individual points in the best fit routes to another position, generating a completely new set of routes and/or changing one or more of the best fit routes in a random manner. Alternatively, the next generation routes may be generated according to a separate set of pre-defined rules. In this respect, it will be appreciated by the skilled person that the next generation of routes may be generated using any suitable method.

This process provides a new set of routes which are then scored as described above to identify a new set of best fit routes. The process of: (a) generating the next generation of routes (step 510), (b) scoring (step 506) and (c) determining the best fit (step 506), may be repeated a number of times, potentially in the thousands, until a solution is found (for example, a route that matches the route criteria) and/or one of the thresholds for pausing the calculation is reached (step 508). During these repetitions, any duplicate routes may be discarded.

The calculation of the set of routes may be paused at any time. The route calculation may be paused when one or more pre-defined thresholds are reached. For example, the threshold may be a time limit for the generation of the one or more routes (for example, 2 seconds, 10 seconds, etc.), a limit on the number of routes with one or more of certain criteria above a pre-determined threshold (for example, 5 routes that score highly against the route time criteria, 3 routes that score highly against the route distance criteria and the route area criteria, etc.), a limit on the number of routes generated (for example, 3 routes, 10 routes, etc.), or any other suitable threshold.

Once a solution has been reached and/or the threshold for pausing the calculation has been reached, one or more routes are output (408) to the user via some form of visual display. These routes may be displayed as a digital map with a visual indication of the route, for example, the route may be shown as a coloured line. The routes may also be displayed to the user as a set of written directions for the user to follow. Where multiple routes are presented to the user, the highest scoring route may be displayed as the first option, with the rest of the routes being displayed as alternative routes, for example, in order of their scoring. For example, the highest scoring route may be displayed on a digital map, whilst the alternative routes are presented as a list next to the map. The user may then select a route from this list for display on the digital map, either instead of or in addition to the highest scoring route.

In cases where the calculation is paused, all of the routes calculated up until the moment the calculation was paused may be output to the user. Alternatively, only the best fit routes (i.e. the highest scoring routes) may be output. The information output to the user may also include the route scoring according to each criteria and/or other route related information such as points of interest included along the route.

Furthermore, if the calculation has been paused, the calculation may later continue from the point where it was paused. This may happen if the set of routes generated is not satisfactory and/or more routes are required for comparison with those previously output to the user. The routes subsequently output the next time the calculation is paused or once the route calculation have been completed may include new routes as well as some or all of the routes previously output to the user. Any duplicate routes, however, may be discarded.

Figure 6:
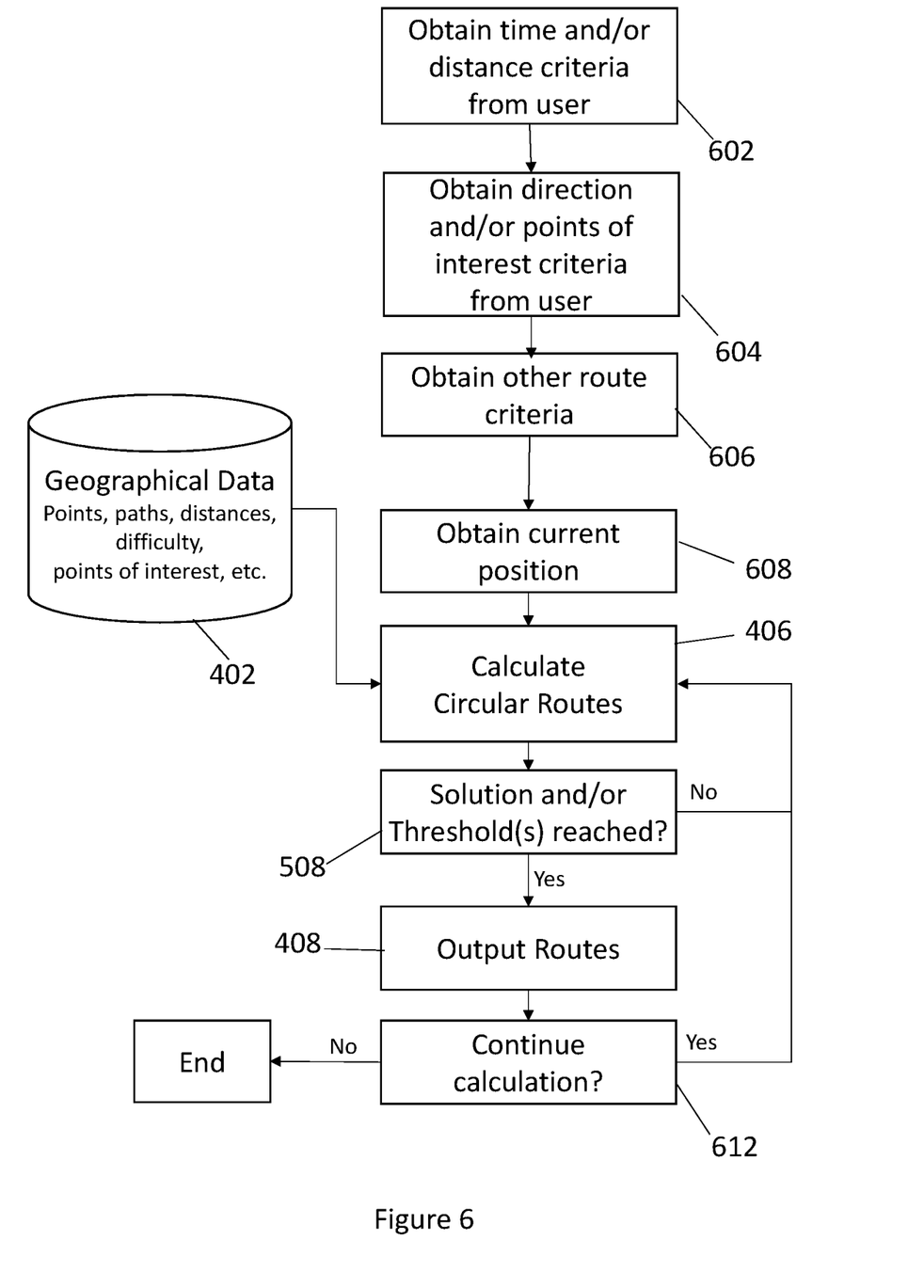
FIG. 6 is an example illustrating one or more illustrative aspects described herein.

An example of the circular routing method in use will now be described with reference to FIG. 6.

The following example describes a user in possession of a portable device having a visual display (for example, smartphone, PDA, tablet, navigation device, etc.), hereinafter referred to as "the device", and intending to follow a route starting and finishing at the user's current position. The portable device will typically have one or more applications, hereinafter referred to as "the application", running in the device that are arranged to carry out the circular routing method described herein.

The application provides a user interface which the user uses to indicate a desired time duration and/or a distance for the route (step 602). For example, the user may indicate that they wish to follow a route that takes around 3 hours to complete and that covers 10 miles. At the same time, the user may also be required to indicate the method of travel, for example, the user may indicate that they wish to walk the route.

The user may also indicate which direction they would like to head in (step 604), for example, in a north-east direction. This information may be input manually to the application by the user, or the user may point the device in the direction they wish to travel, the application using some means in the device to determine the desired direction (for example, a digital compass using a magnetometer sensor).

The user may also define points of interest (step 604) that they wish to see along the route. For example, user may indicate that they wish to walk along a river during the walk, or for the route to take them via a specific pub. These points of interest may be newly defined by the user or they may be chosen from a selection of pre-defined points of interest already stored in the application.

This route time, route distance, route direction and route interest criteria will generally be considered as user indicated data.

Other route criteria may also be obtained (step 606) for input to the route calculation. This may be obtained as further user indicated data, for example, route difficulty or route surface criteria, or as criteria relating to a set of pre-defined rules stored in the application such as route area or route similarity criteria. It will however be appreciated that criteria such as route area or route similarity may also be obtained from user indicated data.

Finally, the user's current position will be determined by the device (step 608) using any suitable method (for example, a GPS antenna), thereby indicating the start/end position A. Alternatively, the user may manually input the start/end position A, for example, in situations where the start/end position A is not the same as the user's current position.

Once all of the route calculation metadata has been collected, including the user indicated criteria, any other criteria, and the start/end position A, the user can instruct the application to calculate a set of circular routes. The application will then use the geographical data 402 and the route calculation metadata to calculate a set of routes (step 406), as described previously with reference to FIG. 5.

When a solution is found and/or one of the thresholds for pausing the calculation is reached (step 508), the calculation is paused or stopped. The current set of routes that best fit the criteria are then presented to the user via the visual display of the device (step 408). These routes may be displayed on the user interface, for example, by displaying a digital map of the geographical area with the route being shown as a coloured line. The routes may also be displayed on the user interface as a set of written directions for the user to follow. Where multiple routes are presented to the user, the highest scoring route may be displayed as the first option, with the rest of the routes being displayed as alternative routes, for example, in order of their scoring. For example, the user interface may comprise a digital map showing the highest scoring route, with the alternative routes being presented as a list next to the map. The user may then select a route from this list for display on the digital map, either instead of or in addition to the highest scoring route. The routes may also be presented with other relevant information such as the route scoring according to each criteria and/or other route related information such as points of interest included in each route.

The user can then review the routes and either choose one and terminate the calculation process, or indicate that the calculation process is to continue in an attempt to calculate better routes (step 612).

Figure 7:
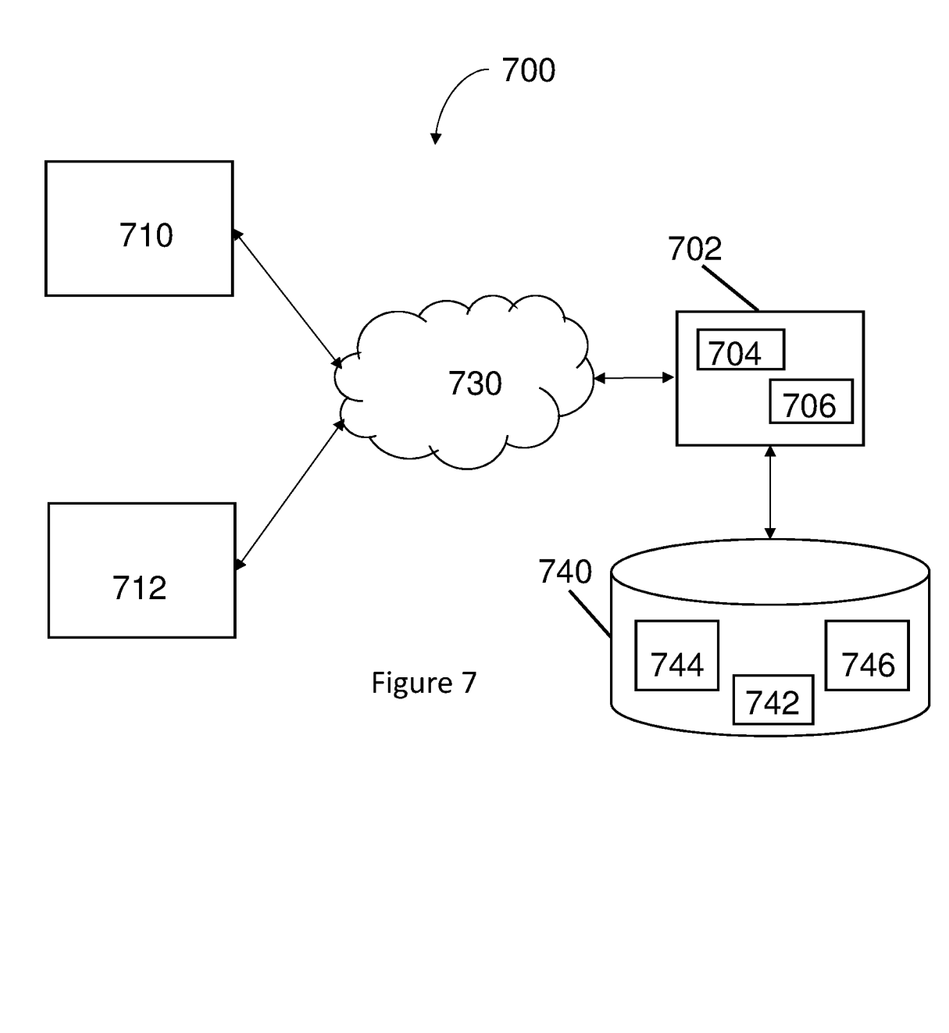
FIG. 7 is a block diagram illustrating a system used to carry out a method according to one or more illustrative aspects described herein.

One example of the system used to implement aspects described herein is shown in FIG. 7. Generally, the system described below implements the method described in detail above, and reference should be made to the above when considering the various steps and processes described below.

FIG. 7 shows a system 700 comprising a server 702 in communication with third party servers 710, 712 via a network 730 through a communications interface 704. The server 702 comprises a processor 706 arranged to carry out computing operations, and is also in communication with a core server 740. The core server 740 runs different software implemented modules which carry out different tasks or provide particular data when required by the processor 706. More specifically, a route data module 742 contains the geographical data and any pre-defined route criteria used to calculate the circular route, as described in the above method. A circular route calculation module 744 is arranged to carry out the steps necessary to calculate the one or more circular routes, as described above with reference to FIG. 5. Upon calculating the one or more circular routes, a route generation module 746 is arranged to generate output data for providing a visual indication of the route, for example, a map showing the route, for distribution to the user via the third party servers 710, 712.

The map server 702 is arranged to receive route calculation metadata via network 703 from the third party servers 710, 712 (for example, the server on which the user's device is running), from which the route criteria and the start/end position A are extracted for input to the circular route calculation module 714. The received route calculation metadata is communicated to the core server 740, which extracts the relevant parts of the geographical data required from the route data module 742, as well as any other pre-defined route criteria. The circular route calculation module 714 is then arranged to carry out the circular route calculation methods described above based on the data extracted from the route data module 742 and the route calculation metadata received from the user via the third party servers 710, 712. Once one or more optimal routes for the user have been calculated, the route generation module 746 uses the calculated route data to generate output data for distribution to the user. The resulting output data is then communicated to the server 702 where it may be used to generate a digital map showing the circular route and/or a set of directions describing the route. The map showing the circular route and/or directions can then be distributed to the third party servers 710, 712 and displayed to the user on a visual display (not shown). As described above, the output data may also include other route related information such as the route scoring according to each criteria and/or other route related information such as points of interest included in each route.

In some arrangements, the user may instruct a printing device (not shown) to produce a readable representation of the route on paper or similar physical media. For example, the map showing the circular route and/or directions as generated by the server 702 may be sent to a printing device where it is used to print a physical map with the circular route information. The user is then able to use this printed map to navigate the route. This may be particularly useful in situations where the user is not able to access the digital version of the route whilst they are out on the route. For example, to generate the route the user may have used a device that is too big or impractical to then take with them (for example, a general purpose computer or a laptop). Alternatively, the user may have used a personal device such as a mobile phone to generate the route, however, a printed version of the route may be needed in case the device loses connectivity or battery during the journey.

It will be appreciated by the skilled person that the system shown by FIG. 7 is just one example of the apparatus that may be used to implement the method described herein, and that any other suitable system may be used. For example, all of the system components required to implement the method described herein may be contained within a single computing device.

Various modifications, whether by way of addition, deletion and/or substitution, may be made to all of the above described aspects and embodiments to provide further aspects and/or embodiments, any and/or all of which are intended to be encompassed by the appended claims.

The invention claimed is:

1. A computer implemented method of generating geographic routes across a geographic area that start and end at the same geographical position A, comprising:
   obtaining route calculation metadata relating to desired parameters of a geographic route to be generated, the metadata including the position A, a first set of criteria from a group comprising one or more of: a route time criterion and a route distance criterion, and a second set of criteria at least comprising a route area criterion;
   calculating, using geographical data representing the geographic area, a first set of geographic routes across the geographic area that start and end at the position A and which at least partially meet one or more of the first set of criteria included in the route calculation metadata;
   calculating a size of the geographical area enclosed by each of the first set of geographic routes;
   ranking the first set of geographic routes by calculating a score based on the first set of criteria and the route area criterion, wherein the first set of geographic routes are scored based on the extent to which the plurality of geographic routes meet one or more of the first set of criteria and the size of the geographical area enclosed, wherein routes that enclose a larger geographical area are scored higher than routes that enclose a smaller geographical area; and
   providing at least one geographic route for output in dependence on the ranking of the first set of geographic routes.

2. The method according claim 1, wherein the first set of criteria comprises a route time criterion indicating a preferred travel time, the first set of geographic routes being ranked based on the similarity of the preferred travel time to an estimated travel time of the first set of geographic routes.

3. The method according claim 1, wherein the first set of criteria comprises a route distance criterion indicating a preferred distance, the first set of geographic routes being ranked based on the similarity of the preferred distance to an actual distance of the first set of geographic routes.

4. The method according to claim 1, wherein the first set of criteria further comprises one or more of:
   i) a route direction criterion indicating a preferred direction of travel;
   ii) a route interest criterion indicating one or more points of interest to be included in the first set of geographic routes;
   iii) a route difficulty criterion indicating a level of difficulty and/or an accessibility requirement of the first set of geographic routes; and
   iv) a route surface criterion indicating at least one type of terrain to be included in the first set of geographic routes.

5. The method according to claim 1, wherein the ranking comprises calculating a first score corresponding to at least one of the first set of criteria included in the route calculation metadata, and calculating a second score corresponding to the route area criterion.

6. The method according to claim 5, further comprising weighting the first and second scores in dependence on the criteria to which it corresponds.

7. The method according to claim 6, wherein the second score corresponding to the route area criterion has a relatively larger weighting.

8. The method according to claim 5, wherein the ranking comprises combining the first and second scores.

9. The method according to claim 1, wherein the method further comprises:
   selecting a set of best fit geographic routes from the ranking of the first set of geographic routes.

10. The method according to claim 9, wherein the set of best fit geographic routes are further used to generate a second set of geographic routes, wherein generating the second set of geographic routes comprises one or more of:

combining all of the set of best fit geographic routes in one or more different ways;

combining one or more subsets of the set of best fit geographic routes; and modifying the set of best fit geographic routes by removing and/or moving at least one geographical position.

11. The method according to claim 1, wherein the calculating the first set of geographic routes is paused or stopped when one or more of the following thresholds is reached:

a time threshold indicating a time limit for calculating the first set of geographic routes;

a criteria threshold indicating the maximum number of routes that at least partially meet the one or more criteria; and a number threshold indicating the maximum number of routes to be calculated.

12. The method according to claim 1, wherein the providing the at least one geographic routes for output comprises generating a visual representation of the at least one geographic route for output to a visual display.

13. The method according to claim 12, wherein the visual representation comprises a map image of the geographic area.

14. The method according to claim 1, wherein the providing the at least one geographic routes for output comprises providing criteria information regarding the extent to which the at least one geographic route meets the first set of criteria.

15. The method according to claim 1, wherein the second set of criteria further comprises a route similarity criterion, and wherein the method further comprises evaluating the number of repeated geographical positions included in the first set of geographic routes according to the route similarity criterion.

16. A system comprising:

a processor; and a non-transitory computer readable medium storing one or more instruction(s) arranged such that when executed the processor is caused to generate routes across a geographic area that start and end at the same geographical position A, the generating comprising:

obtaining route calculation metadata relating to desired parameters of a geographic route to be generated, the metadata including the position A, a first set of criteria from a group comprising one or more of: a route time criterion and a route distance criterion, and a second set of criteria at least comprising a route area criterion;

calculating, using geographical data representing the geographic area, a first set of geographic routes across the geographic area that start and end at the position A and which at least partially meet one or more of the first set of criteria included in the route calculation metadata;

calculating a size of the geographical area enclosed by each of the first set of geographic routes;

ranking the first set of geographic routes by calculating a score based on the first set of criteria and the route area criterion, wherein the first set of geographic routes are scored based on the extent to which the plurality of geographic routes meet one or more of the first set of criteria and the size of the geographical area enclosed, wherein routes that enclose a larger geographical area are scored higher than routes that enclose a smaller geographical area; and providing at least one geographic route for output in dependence on the ranking of the first set of geographic routes.

17. The system according claim 16, wherein the first set of criteria comprises a route time criterion indicating a preferred travel time, the first set of geographic routes being ranked based on the similarity of the preferred travel time to an estimated travel time of the first set of geographic routes.

18. The system according claim 16, wherein the first set of criteria comprises a route distance criterion indicating a preferred distance, the first set of geographic routes being ranked based on the similarity of the preferred distance to an actual distance of the first set of geographic routes.

19. The system according to claim 16, wherein the first set of criteria further comprises one or more of:

(i) a route direction criterion indicating a preferred direction of travel;

(ii) a route interest criterion indicating one or more points of interest to be included in the first set of geographic routes;

(iii) a route difficulty criterion indicating a level of difficulty and/or an accessibility requirement of the first set of geographic routes; and (iv) a route surface criterion indicating at least one type of terrain to be included in the first set of geographic routes.

20. The system according to claim 16, wherein the ranking comprises calculating a first score corresponding to at least one of the first set of criteria included in the route calculation metadata, and calculating a second score corresponding to the route area criterion.

* * * * *